US005616154A

United States Patent [19]
Elliott et al.

[11] Patent Number: 5,616,154
[45] Date of Patent: Apr. 1, 1997

[54] METHOD FOR THE CATALYTIC CONVERSION OF ORGANIC MATERIALS INTO A PRODUCT GAS

[75] Inventors: Douglas C. Elliott; L. John Sealock, Jr.; Eddie G. Baker, all of Richland, Wash.

[73] Assignee: Battelle Memorial Institute, Richland, Wash.

[21] Appl. No.: 227,892

[22] Filed: Apr. 15, 1994

Related U.S. Application Data

[63] Continuation of Ser. No. 893,701, Jun. 5, 1992, abandoned.

[51] Int. Cl.$^6$ .................................................. C10J 3/00
[52] U.S. Cl. .................... 48/197 R; 48/209; 588/248; 585/240; 585/241
[58] Field of Search ............................ 48/192, 209, 214; 210/757, 758, 762, 763; 585/240, 241, 733; 252/373; 588/205–209, 215, 216, 218, 220, 221, 223, 224, 226, 228, 230, 233, 234, 236, 238, 239, 240, 242, 244, 245, 246, 248

[56] References Cited

U.S. PATENT DOCUMENTS

| | | | |
|---|---|---|---|
| 2,944,396 | 7/1960 | Barton et al. | 210/763 |
| 3,148,227 | 9/1964 | Hearon et al. | |
| 3,505,204 | 4/1970 | Hoffman | 208/10 |
| 3,715,195 | 2/1973 | Tassoney et al. | 48/197 |
| 3,890,113 | 6/1975 | Child et al. | 48/197 |
| 3,915,670 | 10/1975 | Lacey et al. | 48/197 R |
| 3,919,114 | 11/1975 | Reynolds | 252/373 |
| 3,926,583 | 12/1975 | Restrup-Nielsen | 48/214 |
| 3,929,431 | 12/1975 | Koh et al. | 48/214 |
| 4,052,302 | 10/1977 | Fletcher et al. | 210/762 |
| 4,059,676 | 11/1977 | Yang et al. | 588/213 |
| 4,082,520 | 4/1978 | Baron et al. | 48/202 |
| 4,113,446 | 9/1978 | Modell et al. | 48/202 |

(List continued on next page.)

FOREIGN PATENT DOCUMENTS

| | | | |
|---|---|---|---|
| 1074117 | 3/1980 | Canada . | |
| 0333037 | 9/1989 | European Pat. Off. | 252/373 |
| 2530600 | 7/1975 | Germany . | |
| 2258098 | 10/1990 | Japan | 210/762 |
| WO8908138 | 9/1989 | WIPO | 252/373 |

OTHER PUBLICATIONS

Elliott et al., "Product Analysis From Direct Liquefaction of Several High Moisture Biomass Feedstocks", American Chemical Society, vol. 32, No. 2 pp. 186–194 (Apr. 1987).
Elliott et al., "Hydrotreating Biomass Liquids to Produce Hydro–Carbon Fuels", Energy from Biomass and Waste X, Apr. 1986 pp. 1–18.
Sealock et al., "Low Temperature Conversion of High Moisture Biomass", Pacific Northwest Labs.–6726, (Jan. 1988) pp. 1–111.
Baker et al., "Catalytic Destruction of Hazardous Organics in Aqueous Solutions", Pacific Northwest Laboratory, Apr., 1988 pp. 1–32.

(List continued on next page.)

*Primary Examiner*—Nina Bhat
*Attorney, Agent, or Firm*—Wells, St. John, Roberts, Gregory & Matkin, P.S.

[57] ABSTRACT

A method for converting organic material into a product gas includes: a) providing a liquid reactant mixture containing liquid water and liquid organic material within a pressure reactor; b) providing an effective amount of a reduced metal catalyst selected from the group consisting of ruthenium, rhodium, osmium and iridium or mixtures thereof within the pressure reactor; and c) maintaining the liquid reactant mixture and effective amount of reduced metal catalyst in the pressure reactor at temperature and pressure conditions of from about 300° C. to about 450° C.; and at least 130 atmospheres for a period of time, the temperature and pressure conditions being effective to maintain the reactant mixture substantially as liquid, the effective amount of reduced metal catalyst and the period of time being sufficient to catalyze a reaction of the liquid organic material to produce a product gas composed primarily of methane, carbon dioxide and hydrogen.

41 Claims, 5 Drawing Sheets

U.S. PATENT DOCUMENTS

| | | | |
|---|---|---|---|
| 4,141,828 | 2/1979 | Okada et al. | 210/762 |
| 4,165,802 | 9/1979 | Slater et al. | 252/373 |
| 4,239,499 | 12/1980 | Pfefferle | 48/197 |
| 4,294,706 | 10/1981 | Kakihara et al. | 210/762 |
| 4,318,712 | 3/1982 | Lang et al. | 48/202 |
| 4,336,034 | 6/1982 | Lang et al. | 48/202 |
| 4,338,199 | 7/1982 | Modell | 210/721 |
| 4,500,323 | 2/1985 | Seigfried et al. | 48/197 |
| 4,543,190 | 9/1985 | Modell | 210/721 |
| 4,669,632 | 10/1987 | Babu et al. | 48/197 |
| 4,751,005 | 6/1988 | Mitsui et al. | 210/762 |
| 5,019,135 | 5/1991 | Sealock, Jr. et al. | 48/197 |
| 5,114,541 | 5/1992 | Bayer | 44/605 |

OTHER PUBLICATIONS

Elliott et al., "Low Temperature, Catalytic Gasification of Wastes For Simultaneios Disposal and Energy Recovery", Energy From Biomass & Wastes IV, IGT Conference, Mar. 1991, pp. 1–9.

Elliott et al., "Bench Scale Reacotr Tests of low Temperature, Catalytic Gasification of Wet Industrial Wastes", Proceedings of the 25th Intersociety Energy Conversion Engineering Conf., vol. 5 pp. 102–106, Aug. 1990.

Amin, S., "Reforming and Decomposition of Glucose in an Aqueous Phase" An ASME Publication, pp. 1–8 (1975) (Aug.).

Butner et al., "Low Temperature Thermochemical Conversion of High Moisture Biomass Feedstocks", Proceedings of the 17th Contractor's Meeting; Nov. 6, 1985, pp. 1–17.

Cox et al., "Conversion of Organic Waste to Fuel Gas", Journal of The Environmental Engineering Division, Jun., 1974, pp. 717–732.

Baker et al., "Thermocatalytic Conversion of Food Processing Wastes", Pacific Northwest Laboratories–6784 (Jan. 1989) pp. 1–21.

Butner et al., "A Process Study of the Biothermal Conversion of Water Hyacinths to Methane", The Humana Press (1988) pp. 105–116.

Butner et al., "A Thermocatalytic Process for the Gasification of High Moisture Food Processing Wastes", Pacific Northwest Lab. (no date available).

Mudge et al., "Catalyzed Steam Gasification of Biomass", Journal of Analytical and Applied Pyrolysis, (Jan. 1979) pp. 165–175.

Baker et al., "Catalytic Destruction of Hazardous Organics in Aqueous Wastes: Continuour Reactor System Experiments", Hazardous Waster & Hazardous Materials, Vo. 6, No. 1 (1989) pp. 87–94.

Baker et al., "Catalytic Destruction of Hazardous Organics In Aqueous Wastes", Hazardous Wastes and Hazardous Materials, (Apr. 1988) pp. 459–462.

Franck, E.U., "Equilibria in Aqueous Electrolyte Systems at High Temperatures and Pressures", Phase Equilibria and Fluid Properties in Chemical Industry, pp. 99–105 (no date available).

Gallagher et al., "Catalytic Coal Gasification For SNG Manufacture" Energy Research, vol. 4, pp. 137–147 (1980) Apr.

Limieux et al., "Preliminary Engineering Data For Scale Up of a Biomass Vacuum Pyrolysis Reactor", American Chemical Society, vol. 32, No. 2, Apr., 1987 pp. 12–20.

Modell, M., "Reforming of Glucose and Wood at the Critical Conditions of Water", An ASME Publication (Jul. 1977) pp. 1–7.

Shafizadeh, F., "Introduction to Pyrolysis of Biomass", J. Analy. Appl. Pyrol., Mar. 1982, vol. 3, pp. 283–305.

Vannice, M.A., "The Catalytic Synthesis of Hydrocarbons from $H_2$/CO Mixtures Over the Group VIII Metals", Journal of Catalysis, (Jun. 1973) pp. 449–461.

Betta, et al., "Heterogenous Methanation: Initial Rate of CO Hydrogenation on Supported Ruthenium and Nickel", Journal of Catalysis 35, 54–60 (Mar. 1974) pp. 54–60.

Amin, S., "Reforming and Decomposition of Organics in Water", Sc.D. Thesis, Massachusetts Institute of Tech., (Aug. 1975) pp. 1–4.

Ross, et al., "The Conversion of Cellulose To Fuel Gasses Promoted By Selected Solid Additives", Conservation & Recycling, vol. 4, pp. 15–28 (Jan. 1981).

Weber, et al., "Gasification of Biomass In The Presence Of Multiple Catalysts For The Direct Production of Specific Products", Energy From Biomass and Wastes IV, pp. 351–368 (Jan. 1980).

Willson et al., "Alkali Carbonate and Nickel Catalysis of Coal–Steam Gasification", Advances in Chemistry Series, No. 131., (1974) pp. 203–216.

Modell, M., "Gasification and Liquefaction of Forest Products in Supercritical Water", 89th National Meeting of the American Inst. of Chemical Engineers, Aug. 1980, pp. 1–23.

Elliott, D.C. et al., "Low Temperature Catalytic Gasification of Wet Industrail Wastes", FY 1989–1990 Interim Rp., Pacific N.W. Laboratory, Apr., 1991 pp. iii–iv, and 27–30.

METHOD FOR THE CATALYTIC CONVERSION OF ORGANIC MATERIALS INTO A PRODUCT GAS

This invention was made with U.S. Government support under Contract No. DE-AC06-76RLO 1830 awarded by the United States Department of Energy. The U.S. Government has certain rights in this invention.

RELATED PATENT DATA

This patent resulted from a continuation application of U.S. application Ser. No. 07/893,701, filed on Jun. 5, 1992, which was expressly abandoned.

TECHNICAL FIELD

This invention relates generally to methods for the destruction of organic materials, and more particularly to methods for converting organic materials into a product gas composed primarily of methane, carbon dioxide and hydrogen.

BACKGROUND ART

The quantities and types of organic waste being generated have grown significantly in recent years. Many of these organic wastes are hazardous in that they present significant environmental anti health hazards. Hazardous wastes previously disposed of by unacceptable methods continue to be discovered in various waste sites. Improved methods for treatment and disposal of these hazardous wastes are required to meet environmental standards and to treat these wastes in a cost-effective manner.

Recently, there have been increased research efforts aimed at improving the method used to remediate hazardous materials at problem waste sites. For wastes containing hazardous organics and water, it is desirable to destroy the organics so the water can be reused or discharged to ground or surface water streams. Thermal technologies currently being developed and employed for destruction of organic material includes incineration, wet air oxidation and supercritical oxidation.

Several commercial treatment technologies exist for treating low organic content water streams (<1000 ppm) by using conventional water purification methods and for treating high concentration streams (>10%) by various costly methods, including solvent extraction and incineration. However, there exists the need to be able to treat concentration ranges not presently commercially treatable (1–5%), as well as other concentration ranges.

Conversion of some waste organic materials, such as contained in biomass materials, to low-Btu fuel gas, carbon monoxide and hydrogen by pyrolysis and substoichiometric burning at 500° C. to 800° C. and about one to ten atmospheres is well known. Studies undertaken to optimize such processes have demonstrated that high temperatures with or without catalysts are required to minimize tar and char formation in the reaction. Recent interest in organic conversion has been aimed at production of a medium-Btu fuel gas through the use of a steam and/or oxygen gasification environment. These processes would produce a cleaner carbon monoxide/hydrogen gas mixture which would be used for synthesis of methane as well as other products.

U.S. Pat. No. 4,239,499 to Pfefferle discloses a process for converting a stream containing 25% or more methanol into a product gas. However, this process has certain limitations in regard to total water content of the feedstock, and requires vapor phase reactions. The process as disclosed is limited to a maximum of 1 mole of methanol to 1.5 moles of water due to potential catalytic deactivation, as discussed at column 5, lines 40–49. Another limitation is the economics of energy required to run the process. The amount of energy required to vaporize a methanol/water stream is about 60% more than to use a liquid stream. Running a vaporized stream at 350° C. requires 1080 Btu/lb. With the concentration of organic in water being held constant, for a liquid stream at 350° C., the amount of energy required is 690 Btu. This approach results in a difference of 390 Btu/lb, and with 8 lb/gallon results in an energy savings of about 3100 Btu per gallon of waste stream.

U.S. Pat. No. 4,113,446 to Modell et al. discloses a process for converting organic material to a product gas by reaction with water at or above the critical temperature of water and at or above the critical pressure of water to achieve the critical density of water. The reaction is indicated to occur regardless of the presence of a catalyst, presumably because of the critical conditions. However, this process also suffers from limitations in regard to the amount of methane produced. This is exemplified by the run with hexanoic acid in which less than one percent of methane was produced from approximately a 2% solution. In view of the low amount of methane production, the energy economics of the system appear very unfavorable. For an example, taking a 10% organic in water solution, the amount of energy required to heat and pressurize the system as disclosed takes about 880 Btu/lb of solution to heat to the critical density of water. However, the gas produced will have a fuel value of only about 40 Btu.

BRIEF DESCRIPTION OF THE DRAWINGS

Preferred embodiments of the invention are described below with reference to the following accompanying drawings.

BEST MODES FOR CARRYING OUT THE INVENTION

In accordance with one aspect of the invention, a method for converting organic material into a product gas comprises:

providing a liquid reactant mixture containing liquid water and organic material within a pressure reactor;

providing an effective amount of a reduced metal catalyst selected from the group consisting of ruthenium, rhodium, osmium and iridium or mixtures thereof within the pressure reactor; and maintaining the liquid reactant mixture and effective amount of reduced metal catalyst in the pressure reactor at temperature and pressure conditions of about 300° C. to about 450° C. and at least 130 atmospheres for a period of time, the temperature and pressure conditions being effective to maintain the reactant mixture substantially as liquid, the effective amount of reduced metal catalyst and the period of time being sufficient to catalyze a reaction of the liquid organic material to produce a product gas composed primarily of methane, carbon dioxide and hydrogen.

For the purpose of this disclosure, "liquid organic material" means any organic compound or mixture of such compounds that exists as or decomposes to a liquid or gas at a temperature of at least 250° C. and at a pressure of 50 atmospheres or more, and any aqueous solution, or any flowable suspension, slurry or sludge containing such a compound or mixture. Examples of potential feedstocks include wastewater streams such as 0.5% hexamethylene diamine in water from nylon manufacture, or 2% to 3% mixed phenols in water from resin manufacture that would be treated primarily for waste destruction. Other feedstocks such as cheese whey, peat, or high-moisture biomass feedstocks would be treated primarily as energy recovery systems. In some cases, both energy recovery and waste destruction would be achieved. The process can treat liquid organic materials having wide ranges of organic concentration from parts per million levels to significantly higher. The process can be used as a method of destroying organic waste or as a method of converting organic feedstocks to an energy source.

Preferably, the liquid organic material and water are fed to a reactor pressure vessel in the form of an aqueous solution or slurry. Where the liquid organic material inherently contains a desired amount of water, such would comprise the liquid reactant mixture without a requirement for added water.

Where the organic material comprises multi-carbon compounds, the effective amount of reduced metal catalysts and the period of time need be sufficient to catalyze a reaction of the liquid organic material to break the carbon-carbon bonds and produce a product gas composed primarily of methane, carbon dioxide and hydrogen.

Inside the reactor, the organic material and water are preferably maintained at subcritical conditions, such as at a temperature from about 300° C. to about 350° C. and at a pressure of from about 130 atmospheres to about 205 atmospheres. Preferably, the pressure within the vessel is just high enough to prevent substantial vaporization of water in the reactor; i.e., to maintain the reaction mixture substantially as liquid. Higher operating pressures, as used in supercritical reaction systems, are viewed as unnecessary and uneconomical. Optimal condition for conversion is about 350° C. and about 205 atmospheres, but significant conversions were achieved at temperatures between 300° C. and 350° C., and at pressures as low as 130 atmospheres.

Thus, a process is disclosed for gasification of reducible organic compounds in water in substantially the liquid state and in the presence of a catalyst at lower temperatures and higher pressures than for conventional prior art gasification. A product gas of methane, carbon dioxide and hydrogen, as well as a clean water byproduct, is the desired result. The process can be used to treat a wide range of organic materials, including by way of example, aliphatic and aromatic hydrocarbons, oxygenated hydrocarbons, nitrogenated hydrocarbons, chlorinated hydrocarbons and carbonaceous feedstocks such as food processing wastes and biomass materials, as well as water streams containing such materials.

The catalyst materials of ruthenium, rhodium, osmium and iridium or mixtures thereof can optionally be provided on a support. Example catalyst supports include alumina, such as alumina powder in the form of alpha alumina. Additional catalyst supports include böhmite, zirconia, carbon granules and titanium dioxide. The preferred catalysts are believed to be reduced ruthenium and rhodium.

In order to study the organic conversion process of the present invention, an experimental reactor system was developed. In the experimental system, aqueous organic feed was converted at low temperatures (300° C. to 460° C.) and pressures up to 340 atm to innocuous gases consisting primarily of methane, carbon dioxide and hydrogen. The experimental system was equipped with a sampling system which allowed several samples to be taken throughout the course of the experiment while the reactor was maintained at reaction temperature and pressure.

Figure 1:
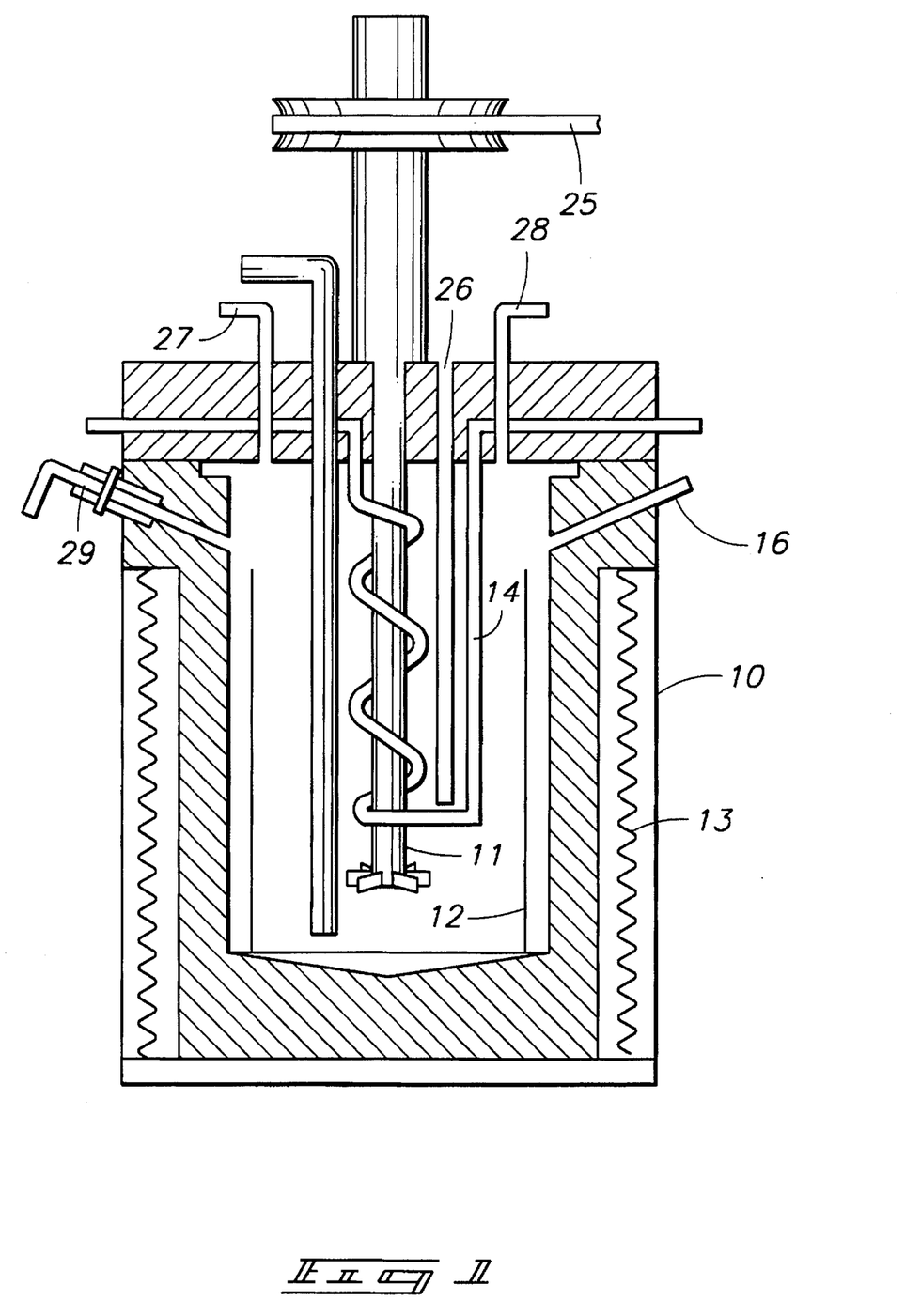
FIG. 1 is a schematic cross-sectional view of an autoclave apparatus for testing the method of the present invention.
Figure 2:
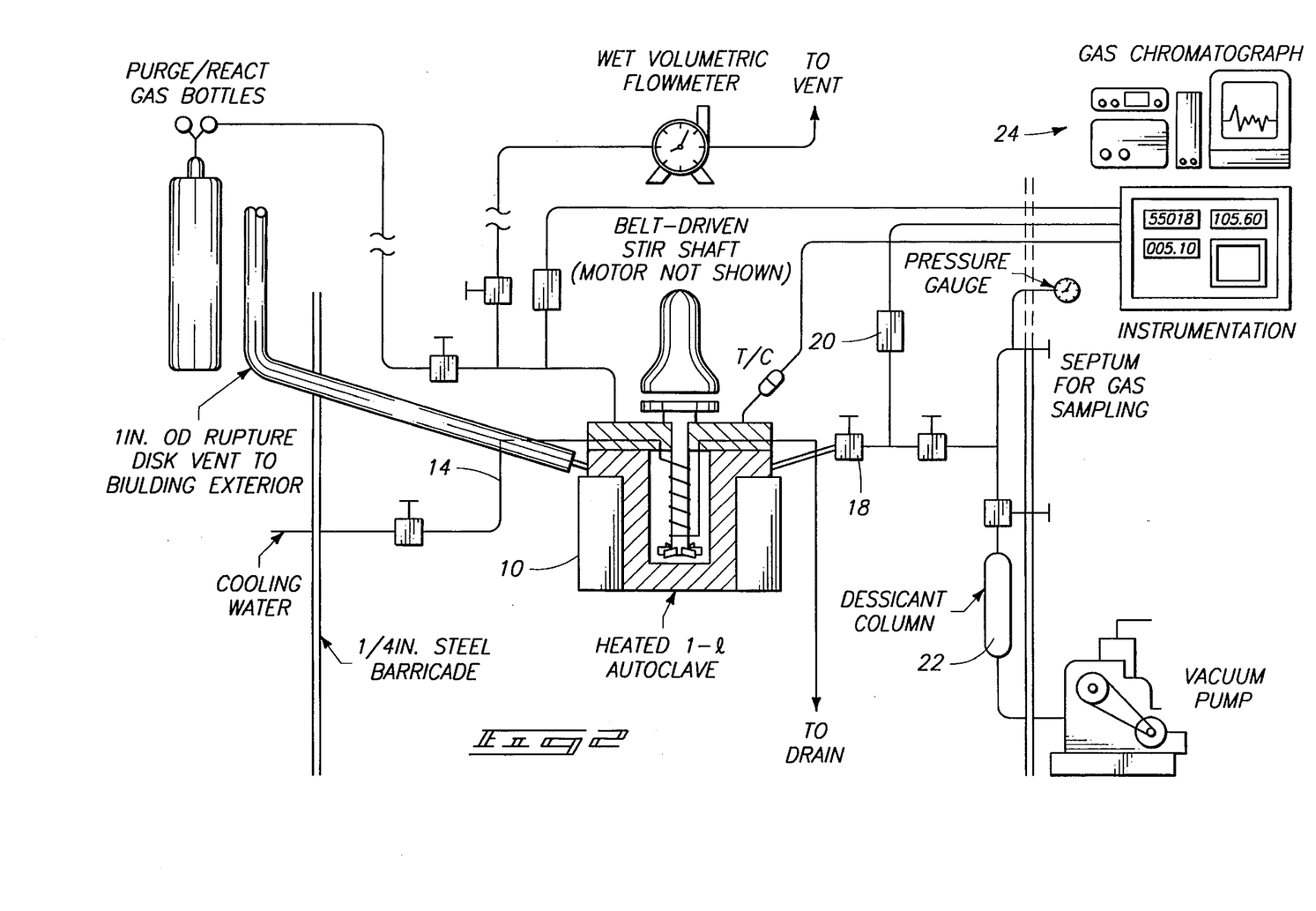
FIG. 2 is a schematic view of the experimental system used in connection with the present invention.
Figure 3:
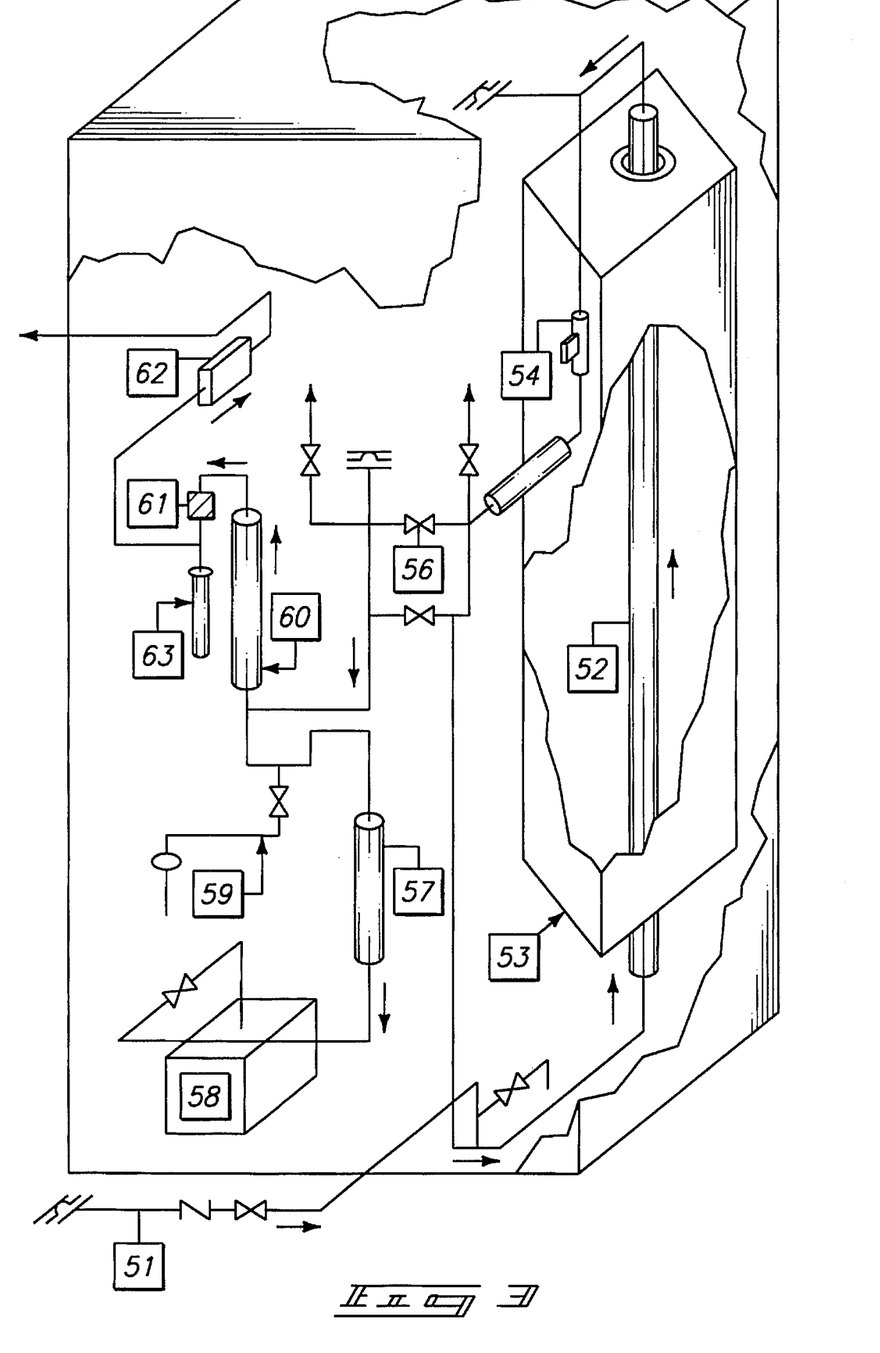
FIG. 3 is a schematic drawing of a bench scale tubular reactor system which was used in connection with the present invention.

The experimental reaction systems used for this process are shown in FIGS. 1, 2, and 3. The batch reactor, shown in FIGS. 1 and 2, consists of a one liter, bolted-closure autoclave 10 equipped with a magnetic stirrer 11 driven by a belt 25. The autoclave 10 is of conventional design and is operated with standard electrical heating, cooling and stirring equipment provided with the unit. A stainless steel liner 12 is fitted into the reactor to facilitate product recovery and reactor cleanup. A thermocouple 26 was received inside liner 12 for monitoring temperature. Pressure within the reaction environment was monitored at outlet 27. An outlet 28 was provided for off gas venting. A rupture disk assembly 29 was provided for over-pressure safety relief.

The autoclave 10 is heated with an electric heater 13 with the capability to heat the reaction environment to approximately 500° C. Typical heat-up time required to heat 300 ml of feedstock and catalyst to 350° C. is about 90 minutes. The feedstock and catalyst are rapidly mixed inside the autoclave 10 by the magnetic stirrer 11. The system is provided with a cooling coil 14 that is used to cool down the reactor contents at the end of each experiment.

Gas samples are taken from the autoclave 10 through a body wall port 16 in the top of the reactor. The autoclave 10 and sample removal system are operated remotely after the reactor has been batch charged. The sampling system shown in FIG. 2 employs the combination of a manually operated sampling valve 18 and a pressure transducer 20 to collect carefully controlled sample volumes. Typically, the sample loop is filled to a pressure of 3 atmospheres.

The volume of the sampling system is about 3.9 ml (2.6 ml sample holding loop plus 1.3 ml dead space prior to the sampling valve). The sampling system allows the entire sample loop to be evacuated prior to taking a sample, thus avoiding contamination from previous samples. The system is equipped with an adsorbent column 22 to collect any water or other liquids in the samples. Column 22 is weighed before and after experiments to permit quantitative determination of the mass of water collected. Tests performed to determine the effect of sample withdrawal from the system have indicated that variances due to the sample removal are indistinguishable from the variations due to experimental error.

In a typical batch catalytic experiment, the desired amount or organic material, catalyst (ground to a powder) and any needed make-up water were weighed and charged to the stainless steel liner 12. The mixed waste/catalyst slurry in the liner 12 was placed in autoclave 10 under ambient conditions. Autoclave 10 was sealed, purged with nitrogen, tested for leaks at 70 atm with nitrogen and vented until the pressure in the reactor was approximately 8 atmospheres. The nitrogen that remained in the reactor was used as a reference to monitor the accumulation of gaseous products produced during the conversion of the organic. This was accomplished by measuring the dilution of the nitrogen in the gas samples taken at regular intervals once the reactor reached the desired reaction temperature. The reactor was then held at this temperature for approximately one hour. Pressures in the system ranged from about 135–375 atm depending on the reaction temperature selected and the amount of gas produced.

At the end of each experiment, cooling water was flushed through the internal cooling coil 14 of the reactor and the contents were brought to a temperature of 200° C. within about 5 minutes. After autoclave 10 had cooled completely, the gas product was vented through a volume meter and analyzed by conventional methods using a gas chromatograph 24. The liquid contents of the reactor were removed, measured and saved for later analysis by conventional methods, including gas chromatography and chemical oxygen demand (COD). Solids, which were primarily the catalyst, were filtered from the liquids, dried, weighed and the carbon content thereof determined.

Conversion was determined by subtracting the amount of COD still present in the reactor liquid product from the COD of the aqueous waste charged to the reactor. Carbon conversions to gas were calculated based on the amount of gas produced and its composition.

Ruthenium, rhodium, platinum and palladium were tested in the batch reactor as possible catalysts in a reaction system at 350° C. and 205 atmospheres using a feed of 10 wt % para-cresol in water. Those results are summarized below in Table 1.

TABLE 1

| Catalyst | C Con, % | $CH_4$ | $CO_2$ | $H_2$ | Time (Min) | C on cat, % |
|---|---|---|---|---|---|---|
| 5% Ru/γ-$Al_2O_3$ powder | 89.1 | 58.9 | 38.8 | 1.0 | 90 | 0.0 |
| 5% Ru/δ-$Al_2O_3$ starcat | 43.5 | 55.2 | 35.9 | 7.7 | 120 | 0.75 |
| 5% Ru/$ZrO_2$ | 28.5 | 44.0 | 35.6 | 13.4 | 90 | NA |
| 3% Ru/δ-$Al_2O_3$ starcat | 18.8 | 40.9 | 37.3 | 20.6 | 120 | 0.38 |
| 1% Ru*/carbon | 4.54 | 22.8 | 45.5 | 27.5 | 75 | — |
| 0.5% Ru*/alum sphere | 0.36 | 8.1 | 25.9 | 56.2 | 80 | NA |
| 5% Rh/carbon | 26.6 | 57.5 | 36.3 | 2.3 | 125 | — |
| 1% Rh/γ-$Al_2O_3$** | 7.06 | 42.1 | 39.1 | 14.4 | 110 | NA |
| 1% Rh*/α-$Al_2O_3$ | 1.54 | 12.7 | 32.9 | 52.5 | 105 | NA |
| 5% Pt/alumina | 1.29 | 26.9 | 63.1 | 3.9 | 90 | 4.3 |
| 5% Pd/alumina | 0.42 | 11.0 | 29.3 | 59.8 | 95 | 6.8 |
| 2% Pd/carbon | 1.20 | 7.2 | 56.3 | 35.2 | 90 | — |
| Pd/kaolin | 0.10 | 0.0 | 53.8 | 44.5 |  | NA |

*suboxide form, not fully reduced to metal
**reduced and dried
NA = not analyzed The percentage numbers under the catalyst column reflect the quantity by weight of the elemental metal with the respective depicted carriers. It was determined by subsequent analysis that the listed 1% and 0.5% ruthenium and the later 1% rhodium were not fully reduced, but rather were in an oxide form. As seen by these results, the oxidized metals have little catalytic activity either for carbon gasification or methanation. The numbers in the carbon on catalyst column reflect the quantity of carbon found on the catalyst which reflects buildup that might shorten the life of the catalyst, or alternately indicates intermediate carbon products that have not yet been completely converted to one of the product constituents. Tests were also conducted with copper, molybdenum, tungsten, chromium, and zinc metals, but these also showed very low levels of catalytic activity.

The above results clearly indicate significant carbon conversion and production of methane, carbon dioxide and hydrogen utilizing ruthenium and rhodium as catalysts. Osmium and iridium are as well expected to be useful catalysts in accordance with this invention because they exhibit similar chemical properties and similar catalytic activity for CO methanation. However, they are more rare and likely to be much more expensive to use as catalysts.

Previous studies have shown reduced nickel metal to be a useful catalyst for reducing organics in a liquid water solution or slurry, such as is disclosed in our co-pending U.S. patent application Ser. No. 07/168,470 entitled "Method For Catalytic Destruction Of Organic Materials", and also in our U.S. Pat. No. 5,019,135, "Method for the conversion of Lignocellulosic Materials", which are hereby incorporated by reference. Long-term operational data has been developed comparing ruthenium against nickel, and is reported below in Table 2.

TABLE 2

|  | 48% Nickel | | | 5% Ruthenium | | | |
|---|---|---|---|---|---|---|---|
|  | para-cresol | | | cresol | phenol | MIBK | cresol |
| Days on Stream | 1 | 2 | 3 | 1 | 5 | 8 | 10 |
| Feed, g COD/L | 45 | 45 | 45 | 45 | 42.5 | 44.5 | 47 |
| Feed Rate, L/hr | 1.60 | 1.64 | 1.58 | 2.11 | 2.03 | 1.42 | 1.15 |
| , g COD/hr | 72.0 | 73.8 | 71.1 | 95.1 | 86.3 | 63.2 | 54.0 |
| LHSV, L feed/L cat/hr | 2.7 | 2.8 | 2.7 | 3.9 | 3.6 | 2.4 | 1.9 |
| Effluent, mg COD/L | 3 | 90 | 14900 | 5 | 7 | 20 | 279 |

TABLE 2-continued

|  | 48% Nickel | | 5% Ruthenium | | | |
| --- | --- | --- | --- | --- | --- | --- |
|  | | para-cresol | cresol | phenol | MIBK | cresol |
| Reduction of COD, % | 99.9 | 99.8 | 68.2 | 99.9 | 99.9 | 99.9 | 99.4 |
| Carbon Conversion to Gas, % | 99.4 | 98.2 | 22.7 | 99.9 | 97.8 | 97.5 | 95.0 |
| Gas Composition, vol% | | | | | | | |
| methane | 62 | 60 | 45 | 61 | 54 | 66 | 58 |
| carbon dioxide | 36 | 37 | 41 | 37 | 42 | 29 | 38 |
| hydrogen | 1.5 | 1.7 | 6.2 | 1.0 | 1.2 | 1.4 | 1.2 |
| ethane | 0.2 | 0.5 | 1.4 | 0.8 | 1.5 | 0.6 | 1.2 |
| $C_3$–$C_4$ | 0.4 | 1.0 | 5.7 | 0.4 | 1.9 | 1.7 | 1.3 |
| Btu/SCF | 644 | 652 | 669 | 651 | 629 | 743 | 656 |
| Gas Yield, L/g solids | 1.45 | 1.41 | 0.30 | 1.43 | 1.41 | 1.27 | 1.33 |
| Mass Balance, % | 102 | 102 | 96.9 | 97.8 | 97.7 | 96.8 | 97.4 |

The continuous flow reactor system used for these tests is depicted in FIG. 3. Specifically, a reciprocating, packed-plunger, positive-displacement pump 51 was used to feed the system. System piping included 0.5-in O.D. (0.065-in. wall) 304 stainless steel tubing on the outlet of pump 51. Pump inlet piping was 0.5-in. O.D. (0.035-in. wall) 304 stainless steel tubing. All valves and valve trim (except the pressure control valve) were also made of stainless steel.

The illustrated tubular reactor 52 was a 2-in. O.D.×1-in. I.D., ×72-in., 304 stainless steel pipe reactor. The screwed-on end-caps contained hold-down bolts for the 304 stainless steel end-pieces and O-ring seals. The vessel was heated by a three-piece ceramic furnace 53. Temperature was monitored on the outside wall and at the center of the catalyst bed at three points along the length of the reactor.

Once the products left reactor 52, they were passed through a sixty micron filter 54 and cooled in a primary condenser 55, and reduced in pressure before entering the separator. Pressure was controlled in the reactor by either a control valve 56 or a dome-loaded back-pressure regulator. Piping downstream from the reactor was 0.25-in. O.D. with thick wall (0.049 in.) tubing before pressure letdown and thin wall (0.035 in.) tubing after. Valve 56 contained a 3/32-in orifice. The valve stem and seat were made of stellite. Excessive wear on the stellite trims led to replacement of the valve with the back-pressure regulator. Both systems functioned adequately while in good condition.

After pressure letdown, separation of phases was effected in a 24 in.×0.5-in diameter tube vertical separator 60. Most of the liquid products were removed via the bottom of the separator through condensation pot 57 and into a liquid collection tank 58. In order to eliminate carryover of water into the gas analysis system, a ball float trap 63 was placed after the secondary condenser as well as a T-type filter 61 with a 0.02-μm hollow fiber membrane filter. The float trap condensate product from both drains was collected in a liquid receiving tank mounted on an electronic load cell.

A liquid sample loop or line 59, upstream of the separator, allowed recovery of small volumes of liquid product before it was dumped into the condensate collecting vessel. These samples were believed to be representative of the reactor contents.

The data acquisition and control (DAC) system employed in the CRS was a hybrid personal computer (PC)-based system employing discrete data acquisition devices and single loop process controllers communicating to a central PC via RS232 serial communications lines. The PC was used during experiments to monitor the process, calibrate instruments, and record data onto an ASCII disk file for later analysis. A custom-made program was used to coordinate these activities. Distributed, single loop control by stand-alone controllers was selected in order to provide additional safety in the event of a DAC system failure, and to reduce the amount of computing overhead assigned to the DAC software. Non-control sensors such as thermocouples and the gas mass flow meter were monitored via a data acquisition unit. The unit processed all raw signals to engineering units before sending the data to the PC for recording. Use of this system permitted a number of data channels to be relayed via a single RS232 serial port, and permitted additional computing overhead to be shifted from the main PC.

Product gas flow rate was measured by a thermal conductivity, mass flow sensor. The unit was calibrated to nitrogen gas (0–2 SLPM), but actual flow rates of mixed gases could be calculated based on known calibration factors and known gas composition. The product gas also flowed through a wet test meter 62 to determine the total flow of gas.

The tubular reactor was sealed once the specified amount and type of catalyst was loaded into the reactor vessel. After the reactor was sealed, the system was pressure-checked with nitrogen. The purge gas was vented from the system and the reactor refilled with hydrogen. The catalyst bed was heated up overnight in the hydrogen to assure a reduced metal catalyst.

When the system had heated to operating temperature, the feedstock was pumped into the reactor system and the final pressurization of the system was achieved. Feed rates, temperatures, and pressures were controlled throughout the experiment while products were recovered and quantified.

To terminate an experiment, the feed pump was stopped and the reactor furnaces were turned off. Pressure was usually left in the reactor during cooldown overnight.

As is apparent from Table 2, catalytic activity of nickel dropped significantly after two days, while that of the ruthenium maintained its activity at 10 days, and certainly more, for several different feedstocks.

Figure 4:
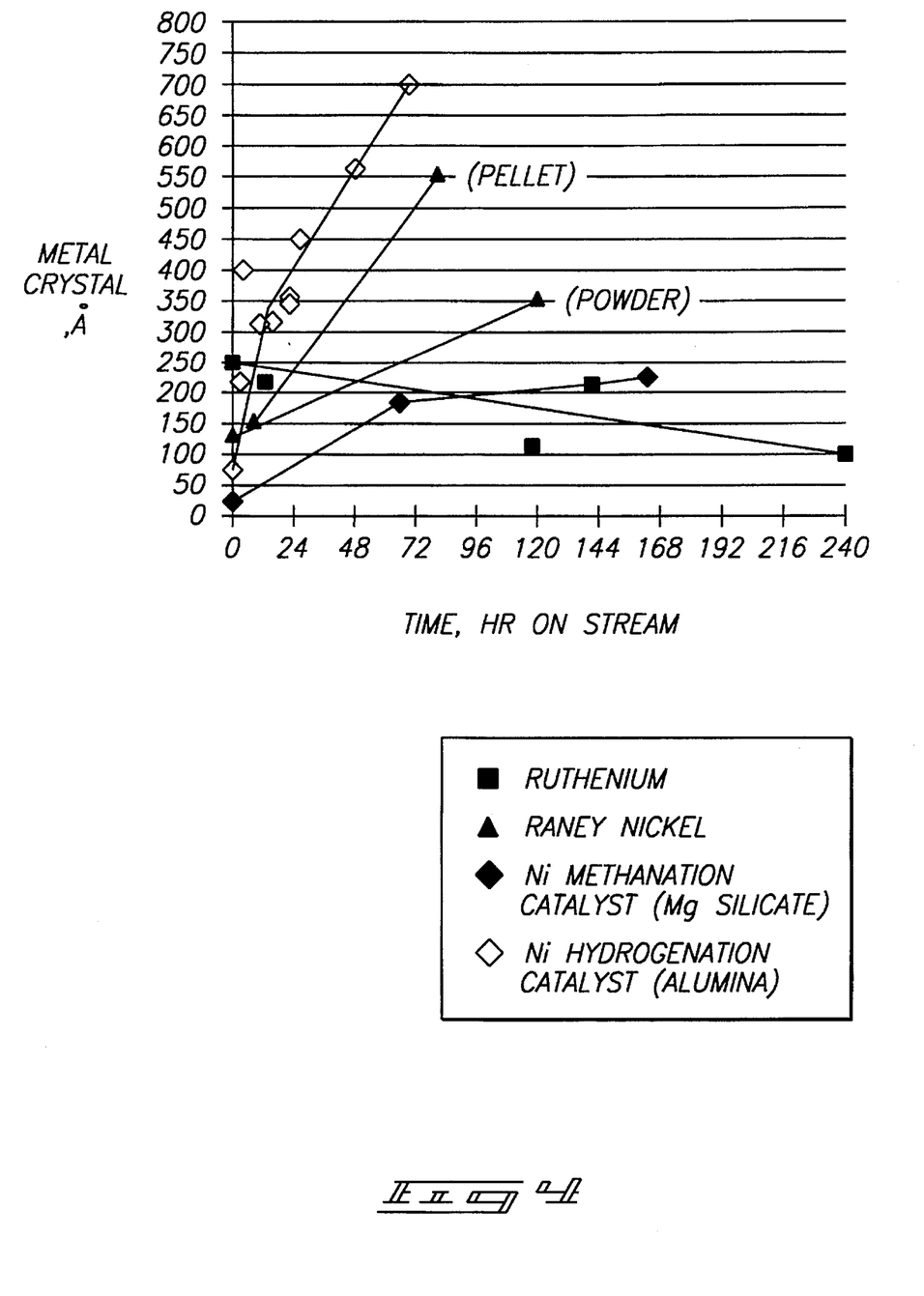
FIG. 4 is a graph of crystal size as a function of reaction time comparing a catalyst used in accordance with the invention to a prior art catalyst.

The stability of nickel and ruthenium crystals at operating conditions were examined by x-ray diffraction measurements, and are reported in FIG. 4. There depicted is the metal crystal size as a function of time at reaction conditions for the reported catalyst. The Raney Nickel catalyst was unsupported, whereas the other two methanation and hydrogenation Ni catalysts were supported on magnesium silicate and alumina supports, respectively. The depicted ruthenium was supported on alumina. As seen in FIG. 4, the rate of change in nickel crystal size varies greatly among an alumina-supported catalyst, a magnesium silicate-supported catalyst and as unsupported. Clearly, it is undesirable that catalyst crystal size increase over time, as such reduces available surface area for catalytic activity for given quantity of catalyst. FIG. 4 indicates that the ruthenium catalyst actually reduces its crystal size over time, potentially enhancing catalytic activity for a given quantity of catalyst.

Rhodium, osmium, and iridium are all expected to have long-term stability similar to the ruthenium because of their noble metal classification. Although ruthenium was demonstrated to clearly have long-term stability at least an order of magnitude greater than nickel, the cost differential between the two metals is great. Even with the greater stability of ruthenium, a cost-effective catalyst may not be available. In such a case a mixture of Ni with the other described metals may be preferable. In such instances and as described in our U.S. Pat. No. 5,019,135 and our co-pending U.S. patent application Ser. No. 07/168,470, reduced nickel in an effective amount will itself exhibit catalytic activity. The use of less than 1 wt. % ruthenium in the reduced nickel may sufficiently stabilize the reduced nickel metal such that crystal growth and resultant loss of active surface area are no longer problems, as they have been with nickel use alone. In this case Ru would act as a spacer to limit crystal growth. The use of spacers such as gold has been used in several catalyst applications.

Useful catalyst support materials have also been identified by testing in the batch reactor. Most conventional supports consisting of silicates or refractory cements have been found to be chemically and physically unstable in the reaction environment of the present process. Tests with various aluminas suggest that böhmite is the thermodynamically favored form at those conditions, as the δ, η, and γ forms all react to form böhmite. Only the α-alumina appears to resist hydration at reaction conditions. Other potential supports have been tested including carbon granules and titania and zirconia tableted powders. All exhibit relatively good chemical-stability at reaction conditions. The metal-loaded carbon did show some reaction of the carbon with the water to produce gases, which may limit its utility in the long term. Neither titania nor zirconia were hydrated and the zirconia in particular maintained a strong physical integrity.

The water present should be sufficient to provide hydrogen as needed to promote the formation of product gases, such as $CH_4$. Where the organic material can be represented as $C_mH_nO_gN_jX_r$, the liquid water present in the reactant mixture should be in an amount equal to or in excess of the molar quantity according to the following formula:

wherein "X" is a halogen, "m" and "n" are each greater than or equal to one, and "g", "j", and "r" are each greater than or equal to zero.

Energy Economics of the Process

As noted in the discussion regarding prior art above, other proposed systems suffer from the economics of the total amount of energy required to run the process and the total amount of energy produced by the process. This is exemplified by the following examples.

To deliver vaporized feedstock to a reactor as described in U.S. Pat. No. 4,239,499, the amount of energy required to vaporize a methanol/water stream is about 60% more than is required for a liquid stream. Running a vaporized stream at 350° C. and 1500 psig requires 1080 Btu/lb. Using the process of our invention and with a concentration of organic and water being held substantially constant, a liquid stream at 350° C. and 3000 psig, requires 690 Btu for heating and pressurization. This results in a difference of 390 Btu/lb, and with 8 lb/gallon this results in a difference of about 3100 Btu per gallon of reactant stream. In addition, the use of higher pressure and a more dense reaction medium (while preferably maintaining subcritical fluid conditions) allows the use of smaller reactor sizes for equivalent throughputs.

Using a process as described in U.S. Pat. No. 4,113,446 and a 10% organic (hexanoic acid) in water solution, the amount of energy required by the system as disclosed takes 880 Btu/lb of solution to heat and pressurize to the critical density of water to produce a gas having a heating value of only 40 Btu. In the process of our invention, the amount of energy required for 350° C. and 3000 psig is 690 Btu/lb of solution with gas having a heating value of 1330 Btu/lb of solution. This results in a net value of 640 Btu/lb or about 5100 Btu per gallon of waste stream.

Preferred Method of Larger Scale Conversion

Figure 5:
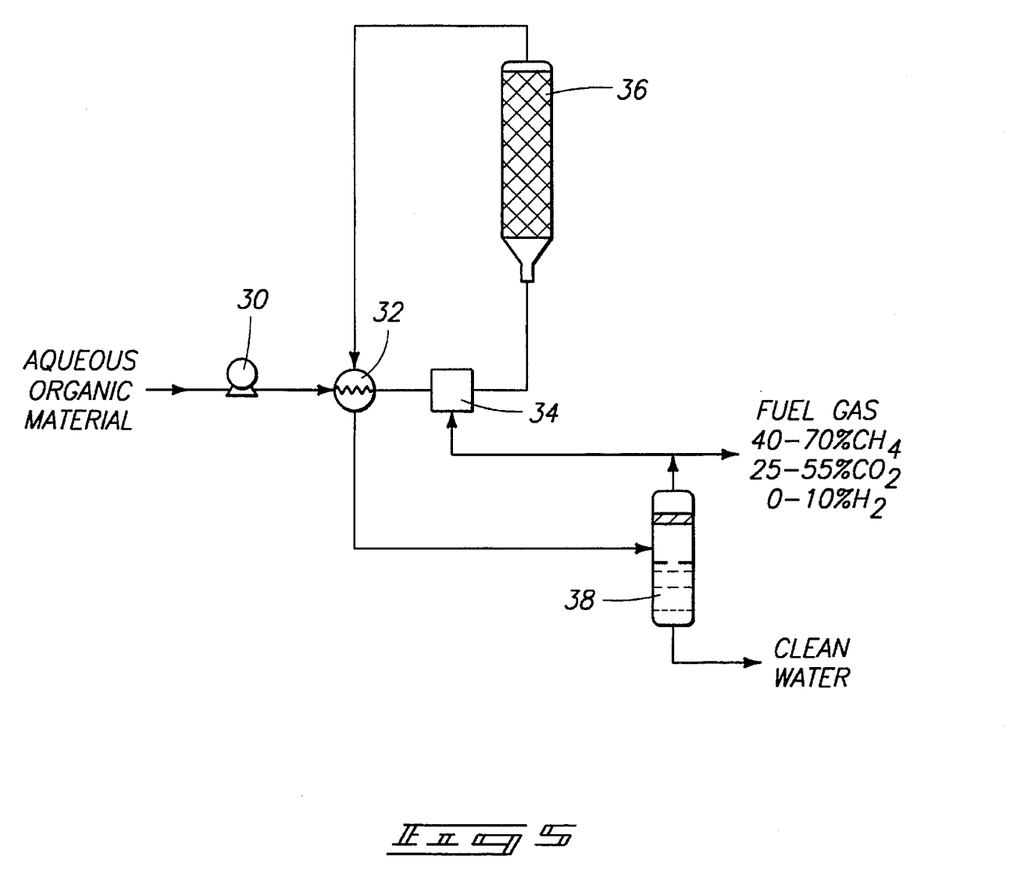
FIG. 5 is a schematic view of a process for the catalytic destruction of organic material in accordance with the present invention.

FIG. 5 shows an apparatus for a preferred embodiment of the process of the present invention. The organic material in an aqueous solution is pumped to 200 atm by a high pressure pump 30, and then passed through a heat exchanger 32 to preheat the waste stream to 350° C. It is believed that most of the preheat can be provided by heat exchange with the reactor effluent. Necessary auxiliary heat may be supplied by an outside heat source or by burning the product gas in a heater 34. If the carbon content of the waste stream is 1 wt % or more, it should provide sufficient fuel gas to heat the process.

After being preheated, the liquid reactant mixture is delivered to a pressure reactor 36 for conversion of the organic material into a product gas. After being passed through heat exchanger 32 to preheat the incoming liquid reactant mixture, the effluent from reactor 36 is separated into constituent parts, as in a separator 38, or by other conventional gas recovery methods.

In a continuous system where the product gas may be removed or vented as it is produced, the pressure in the system can be reduced. To minimize the process energy requirements, the pressure must be high enough to maintain the reaction mixture substantially as a liquid. Based upon the enthalpy and specific volume of water at various conditions, it is believed that the optimum operating conditions are 300° C. to 350° C., and a pressure sufficient to maintain the reactant mixture substantially as a liquid to avoid energy loss by vaporizing the water, as would be required in supercritical operation.

We claim:

1. A method for converting organic material into a product gas comprising:

providing a liquid reactant mixture containing liquid water and liquid organic material within a pressure reactor;

providing a metal catalyst within the pressure reactor, the metal catalyst comprising a first catalyst, the first catalyst comprising a reduced metal selected from the group consisting of ruthenium, iridium, rhodium and mixtures thereof; and maintaining the liquid reactant mixture and metal catalyst in the pressure reactor at temperature and pressure conditions of from about 300° C. to about 450° C. and at least 130 atmospheres for a period of time, the temperature and pressure conditions being effective to maintain the reactant mixture substantially as liquid for the period of time, the period of time as liquid being sufficient to allow the metal catalyst to catalyze a reaction of the liquid organic material to produce a product gas composed primarily of methane, carbon dioxide and hydrogen.

2. The method of converting organic material into a product gas of claim 1 wherein the metal catalyst comprises a second catalyst, the second catalyst comprising reduced nickel.

3. The method of converting organic material into a product gas of claim 1 wherein the temperature conditions are from about 300° C. to about 350° C.

4. The method of converting organic material into a product gas of claim 1 wherein the pressure conditions are from about 130 atmospheres to about 205 atmospheres.

5. The method of converting organic material into a product gas of claim 1 wherein the metal catalyst is supported on a carrier comprising alumina.

6. The method of converting organic material into a product gas of claim 1 wherein the metal catalyst is supported on a carrier comprising α-alumina.

7. The method of converting organic material into a product gas of claim 1 wherein the metal catalyst is supported on a carrier comprising böhmite.

8. The method of converting organic material into a product gas of claim 1 wherein the metal catalyst is supported on a carrier selected from the group consisting of titania, zirconia, and carbon.

9. The method of converting organic material into a product gas of claim 1 wherein the organic material comprises $C_m H_n O_g N_j X_r$, and liquid water is present in the reactant mixture in an amount equal to or in excess of the molar quantity according to the following formula:

$$C_m H_n O_g N_j X_r + 1/4\, (4m - n - 2g + 4j + r)\, H_2O \rightarrow$$

$$\left\{ \begin{array}{c} 1/8\, (4m + n - 2g - 4j - r)\, CH_4 + \\ 1/8\, (4m - n + 2g + 4j + r)\, CO_4 + \\ r\, HX + j NH_3 + 1/2\, j H_2 \end{array} \right\}$$

wherein "X" is a halogen, "m" and "n" are each greater than or equal to one, and "g", "j", and "r" are each greater than or equal to zero.

10. The method of converting organic material into a product gas of claim 9 wherein, the temperature conditions are from about 300° C. to about 350° C.; and the pressure conditions are from about 130 atmospheres to about 205 atmospheres.

11. The method of converting organic material into a product gas of claim 1 wherein the first catalyst is ruthenium.

12. The method of converting organic material into a product gas of claim 1 wherein the first catalyst is selected from the group consisting of ruthenium, rhodium and mixtures thereof.

13. The method of converting organic material into a product gas of claim 12 wherein the metal catalyst comprises a second catalyst, the second catalyst comprising reduced nickel.

14. The method of converting organic material into a product gas of claim 1 wherein, the first catalyst is selected from the group consisting of ruthenium, rhodium and mixtures thereof;

the temperature conditions are from about 300° C. to about 350° C.; and the pressure conditions are from about 130 atmospheres to about 205 atmospheres.

15. The method of converting organic material into a product gas of claim 1 wherein the first catalyst comprises reduced ruthenium, and wherein the metal catalyst comprises a second catalyst, the second catalyst comprising reduced nickel.

16. A method for converting organic material comprising multi-carbon compounds into a product gas, the method comprising the following steps:

providing within a pressure reactor a liquid reactant mixture containing liquid water and liquid organic material comprising organic compounds having carbon-carbon bonds;

providing a metal catalyst the metal catalyst comprising a first catalyst, the first catalyst comprising a reduced metal selected from the group consisting of ruthenium, iridium, rhodium and mixtures thereof; and maintaining the liquid reactant mixture and metal catalyst in the pressure reactor at temperature and pressure conditions of from about 300° C. to about 450° C. and at least 130 atmospheres for a period of time, the temperature and pressure conditions being effective to maintain the reactant mixture substantially as liquid for the period of time, the period of time as liquid being sufficient to allow the metal catalyst to catalyze a reaction of the liquid organic material to break the carbon-carbon bonds and produce a product gas composed primarily of methane, carbon dioxide and hydrogen.

17. The method of converting organic material comprising multi-carbon compounds into a product gas of claim 16 wherein the metal catalyst comprises a second catalyst, the second catalyst comprising reduced nickel.

18. The method of converting organic material comprising multi-carbon compounds into a product gas of claim 16 wherein the temperature conditions are from about 300° C. to about 350° C.

19. The method of converting organic material comprising multi-carbon compounds into a product gas of claim 18 wherein the pressure conditions are from about 130 atmospheres to about 205 atmospheres.

20. The method of converting organic material comprising multi-carbon compounds into a product gas of claim 16 wherein the metal catalyst is supported on a carrier comprising alumina.

21. The method of converting organic material comprising multi-carbon compounds into a product gas of claim 16 wherein the metal catalyst is supported on a carrier comprising α-alumina.

22. The method of converting organic material comprising multi-carbon compounds into a product gas of claim 16 wherein the metal catalyst is supported on a carrier comprising böhmite.

23. The method of converting organic material into a product gas of claim 16 wherein the metal catalyst is supported on a carrier selected from the group consisting of titania, zirconia, and carbon.

24. The method of converting organic material comprising multi-carbon compounds into a product gas of claim 16 wherein the organic material comprises $C_m H_n O_g N_j X_r$, and liquid water is present in the reactant mixture in an amount equal to or in excess of the molar quantity according to the following formula:

$$C_mH_nO_gN_jX_r + 1/4\,(4m - n - 2g + 4j + r)\,H_2O \rightarrow$$

$$\left\{\begin{array}{c} 1/8\,(4m + n - 2g - 4j - r)\,CH_4 + \\ 1/8\,(4m - n + 2g + 4j + r)\,CO_4 + \\ r\,HX + j\,NH_3 + 1/2\,jH_2 \end{array}\right\}$$

wherein "X" is a halogen, "m" and "n" are each greater than or equal to one, and "g", "j", and "r" are each greater than or equal to zero.

25. The method of converting organic material comprising multi-carbon compounds into a product gas of claim 24 wherein, the temperature conditions are from about 300° C. to about 350° C.; and the pressure conditions are from about 130 atmospheres to about 205 atmospheres.

26. The method of converting organic material comprising multi-carbon compounds into a product gas of claim 18 wherein the first catalyst is ruthenium.

27. The method of converting organic, material comprising multi-carbon compounds into a product gas of claim 16 wherein the first catalyst is selected from the group consisting of ruthenium, rhodium and mixtures thereof.

28. The method of converting organic material comprising multi-carbon compounds into a product gas of claim 27 wherein the metal catalyst comprises a second catalyst, the second catalyst comprising reduced nickel.

29. The method of converting organic material comprising multi-carbon compounds into a product gas of claim 16 wherein, the first catalyst is selected from the group consisting of ruthenium, rhodium and mixtures thereof;

the temperature conditions are from about 300° C. to about 350° C.; and the pressure conditions are from about 130 atmospheres to about 205 atmospheres.

30. The method of converting organic material comprising multi-carbon compounds into a product gas of claim 16 wherein the reduced metal catalyst comprises reduced ruthenium, and wherein the metal catalyst comprises a second catalyst, the second catalyst comprising reduced nickel.

31. A method for converting oxygenated hydrocarbon material into a product gas comprising:

providing a liquid reactant mixture containing liquid water and liquid oxygenated hydrocarbon material within a pressure reactor;

providing a metal catalyst within the pressure reactor, the metal catalyst comprising reduced ruthenium supported on a catalyst carrier, the reduced ruthenium comprising 5% by weight of the combined reduced ruthenium and said carrier;

the liquid reactant mixture and the combined reduced ruthenium catalyst with carrier being fed to the pressure reactor at a liquid hourly space velocity ratio of from about 1.9 to about 3.9 liters of reactant per liters of combined reduced ruthenium catalyst with carrier per hour; and maintaining the liquid reactant mixture and metal catalyst in the pressure reactor at temperature and pressure conditions of from about 300° C. to about 450° C. and at least 130 atmospheres for a period of time, the temperature and pressure conditions being effective to maintain the reactant mixture substantially as liquid, the period of time being sufficient to allow the metal catalyst to catalyze a reaction of the liquid oxygenated hydrocarbon material to produce a product gas composed primarily of methane, carbon dioxide and hydrogen.

32. The method of claim 31 wherein the oxygenated hydrocarbon material comprises aromatic compounds.

33. The method of claim 31 wherein the oxygenated hydrocarbon material comprises ketone compounds.

34. The method of claim 31 wherein the oxygenated hydrocarbon material is selected from the group consisting of phenol, cresol, para-cresol, and methylisobutyl ketone.

35. The method of claim 31 wherein the oxygenated hydrocarbon material is selected from the group consisting of phenol and para-cresol.

36. A method for converting oxygenated hydrocarbon material comprising multi-carbon compounds into a product gas, the method comprising the following steps:

providing within a pressure reactor a liquid reactant mixture containing liquid water and liquid oxygenated hydrocarbon material comprising organic compounds having carbon-carbon bonds;

providing a metal catalyst within the pressure reactor, the metal catalyst comprising reduced ruthenium supported on a catalyst carrier, the reduced ruthenium comprising 5% by weight of the combined reduced ruthenium and said carrier;

the liquid reactant mixture and the combined reduced ruthenium catalyst with carrier being fed to the pressure reactor at a liquid hourly space velocity ratio of from about 1.9 to about 3.9 liters of reactant per liters of combined reduced ruthenium catalyst with carrier per hour; and maintaining the liquid reactant mixture and metal catalyst in the pressure reactor at temperature and pressure conditions of from about 300° C. to about 450° C. and at least 130 atmospheres for a period of time, the temperature and pressure conditions being effective to maintain the reactant mixture substantially as liquid, the period of time being sufficient to allow the metal catalyst to catalyze a reaction of the liquid oxygenated hydrocarbon material to break the carbon-carbon bonds and produce a product gas composed primarily of methane, carbon dioxide and hydrogen.

37. The method of claim 36 wherein the oxygenated hydrocarbon material comprises aromatic compounds.

38. The method of claim 36 wherein the oxygenated hydrocarbon material comprises ketone compounds.

39. The method of claim 36 wherein the oxygenated hydrocarbon material is selected from the group consisting of phenol, cresol, para-cresol and methylisobutyl ketone.

40. The method of claim 36 wherein the oxygenated hydrocarbon material is selected from the group consisting of phenol and para-cresol.

41. A method for converting organic material into a product gas, wherein the organic material comprises organic compounds selected from the group consisting of aliphatic compounds, aromatic compounds, oxygenated hydrocarbon compounds, nitrogenated hydrocarbon compounds and chlorinated hydrocarbon compounds, the method comprising:

providing a liquid reactant mixture containing liquid water and liquid hydrocarbon material within a pressure reactor;

providing a metal catalyst within the pressure reactor, the metal catalyst comprising reduced ruthenium supported on a catalyst carrier, the reduced ruthenium comprising 5% by weight of the combined reduced ruthenium and said carrier;

the liquid reactant mixture and the combined reduced ruthenium catalyst with carrier being fed to the pressure reactor at a liquid hourly space velocity ratio of from about 1.9 to about 3.9 liters of reactant per liters of combined reduced ruthenium catalyst with carrier per hour; and maintaining the liquid reactant mixture and metal catalyst in the pressure reactor at temperature and pressure conditions of from about 300° C. to about 450° C. and at least 130 atmospheres for a period of time, the temperature and pressure conditions being effective to maintain the reactant mixture substantially as liquid, the period of time being sufficient to allow the metal catalyst to catalyze a reaction of the liquid hydrocarbon material to produce a product gas composed primarily of methane, carbon dioxide and hydrogen.

* * * * *

UNITED STATES PATENT AND TRADEMARK OFFICE
CERTIFICATE OF CORRECTION

PATENT NO. : 5,616,154
DATED : Apr. 1, 1997
INVENTOR(S) : Elliott et al.

It is certified that error appears in the above-indentified patent and that said Letters Patent is hereby corrected as shown below:

In column 5, table 1, line 48, please replace "5% Pt/alumina" with --5% Pt/alumina**--.

In column 5, table 1, line 49, please replace "5% Pd/alumina" with --5% Pd/alumina**--.

Signed and Sealed this

Fourth Day of November, 1997

*Attest:*

BRUCE LEHMAN

*Attesting Officer*     Commissioner of Patents and Trademarks